United States Patent [19]

Fischer

[11] 4,185,536

[45] Jan. 29, 1980

[54] MOUNTING ELEMENT

[76] Inventor: Artur Fischer, Weinhalde 34, D-7244 Waldachtal 3 (Tumlingen), Fed. Rep. of Germany

[21] Appl. No.: 873,086

[22] Filed: Jan. 27, 1978

[30] Foreign Application Priority Data

| Mar. 17, 1977 | [DE] | Fed. Rep. of Germany | 2711605 |
| Apr. 27, 1977 | [DE] | Fed. Rep. of Germany | 2718625 |
| Sep. 26, 1977 | [DE] | Fed. Rep. of Germany | 2743174 |

[51] Int. Cl.² ............................................. F16B 13/14
[52] U.S. Cl. ............................................. 85/83; 85/72
[58] Field of Search .............. 85/68, 72, 81, 82, 83, 85/84, 80

[56] References Cited

U.S. PATENT DOCUMENTS

| 1,267,903 | 5/1918 | Pleister | 85/84 |
| 1,476,835 | 12/1923 | Pleister | 85/82 |
| 1,821,400 | 9/1931 | Peirce | 85/72 |
| 2,172,125 | 9/1939 | Hamill | 85/83 |
| 3,082,657 | 3/1963 | Fischer | 85/72 |
| 3,199,398 | 8/1965 | Weisz | 85/83 |
| 3,413,887 | 12/1968 | Wolff et al. | 85/83 |
| 3,487,745 | 1/1970 | Brunelle | 85/82 X |

FOREIGN PATENT DOCUMENTS

| 1450983 | 3/1969 | Fed. Rep. of Germany | 85/72 |
| 1292946 | 4/1969 | Fed. Rep. of Germany | 85/84 |
| 2129218 | 12/1971 | Fed. Rep. of Germany | 85/83 |
| 1500990 | 7/1973 | Fed. Rep. of Germany | 85/83 |
| 2310490 | 12/1976 | France | 85/83 |
| 474685 | 8/1969 | Switzerland | 85/82 |
| 1166262 | 10/1969 | United Kingdom | 85/84 |
| 1184469 | 3/1970 | United Kingdom | 85/83 |

*Primary Examiner*—Thomas J. Holko
*Attorney, Agent, or Firm*—Michael J. Striker

[57] ABSTRACT

A mounting element for mounting an object to a support structure has an outer sleeve-shaped anchoring member adapted to be inserted into a mounting hole of a support structure and having an inner bore, and an inner threaded member insertable into the inner bore of the anchoring element. The anchoring member has an axis and a first portion and a second portion axially spaced from one another and bounding a first section and a second section of the inner bore, respectively. The second portion of the anchoring member has at least two slots extending in an axial direction and closed at their both axial ends so as to impart yieldability to the second portion of the anchoring member. The first section of the inner bore of the anchoring member bounded by the first portion has a diameter at most equal to the root diameter of the thread of the inner threaded member. The first and second portions of the anchoring member form means for anchoring the latter in relatively unyieldable and yieldable support structures, respectively.

15 Claims, 3 Drawing Figures

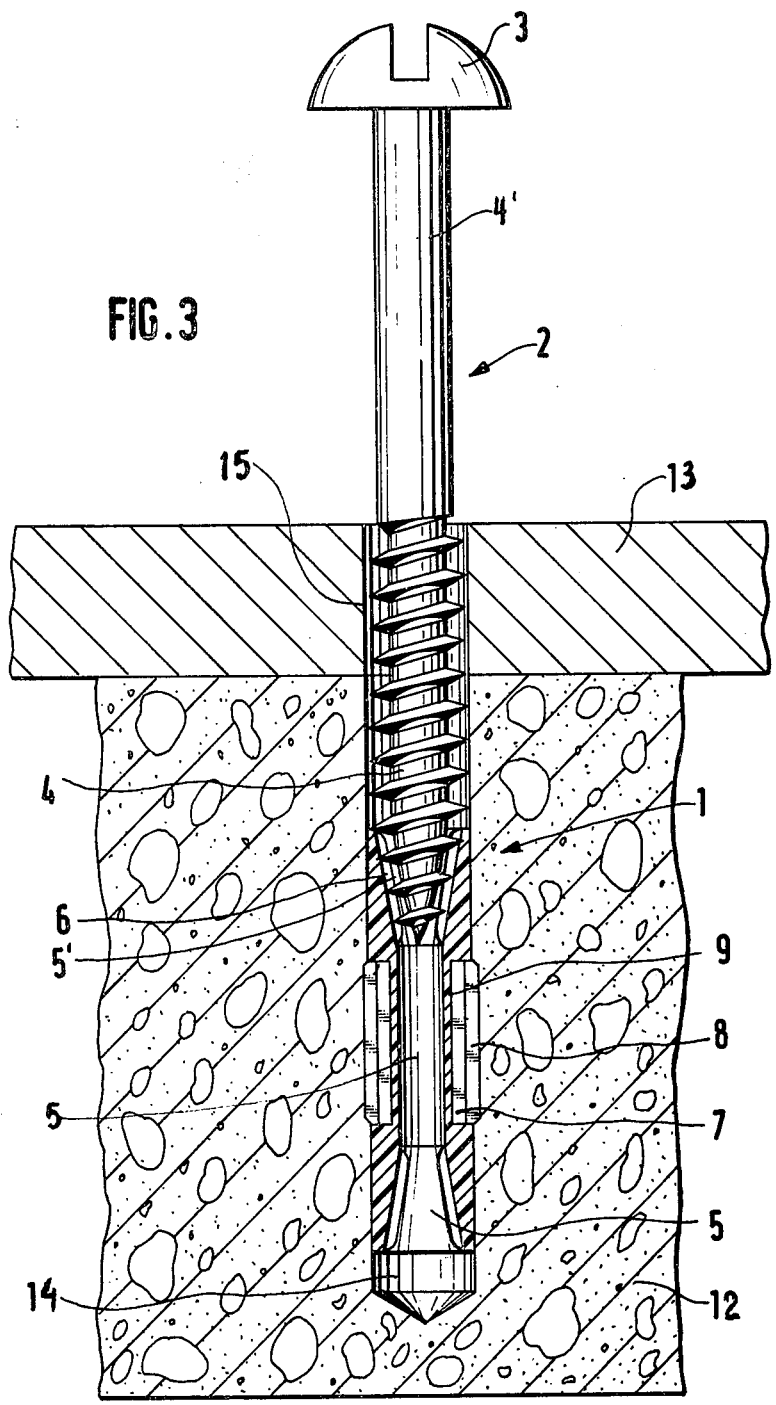

MOUNTING ELEMENT

BACKGROUND OF THE INVENTION

The present invention relates to a mounting element for mounting an object to a support structure.

Mounting elements for mounting an object to a support structure have been proposed in the art. By means of the known mounting elements the objects are mounted to a support structure with the aid of pass-through mounting, in which case a diameter of a through hole in the object and a diameter of a mounting hole in the structure corresponds to the diameter of the mounting screw. When the outer sleeve-shaped anchoring member is inserted into the mounting hole of the structure and the inner threaded member is threaded into an inner bore of the anchoring member, the material of the latter is radially outwardly displaced so that it is clamped between the turns of the thread of the mounting screw and the wall bounding the mounting hole. In connection with the above relation of the diameters the material of the anchoring member is cut by threading of the mounting screw and moved by the thread of the latter so that, on the one hand, this assures sealing of the material of the anchoring member and, on the other hand, this provides wedging between the turns of the thread and the wall of the mounting hole whereby an extremely high holding force in a hard support structure is obtained. However, in soft support structures this does not cause the above clamping and wedging, inasmuch as the soft support structure is yieldable. In such support structure a substantially high holding force could be obtained by expanding the anchoring member in the mounting hole of the structure. However, the known mounting elements cannot provide such expansion inasmuch as their anchoring members have a circumferentially complete configuration.

SUMMARY OF THE INVENTION

Accordingly, it is an object of the present invention to provide a mounting element for mounting an object to a support structure, which avoids the disadvantages of the prior art.

More particularly, it is an object of the present invention to provide a mounting element for mounting an object to a support structure, which assures that it can be anchored not only in a hard support structure, but also in a soft and relatively yieldable support structure and at the same time guarantees a high holding force.

Another object of the present invention is to provide a mounting element for mounting an object to a support structure, which guarantees a high holding force when it is anchored either in a hard structure or in a soft structure, and at the same time has a simple construction and is inexpensive to manufacture.

In keeping with these objects, and with others which will become apparent hereinafter, one feature of the present invention resides, briefly stated, in a mounting element for mounting an object to a support structure which has an outer sleeve-shaped anchoring member and an inner threaded member insertable into an inner bore of the anchoring member, and also means for anchoring the anchoring member in a relatively unyieldable support structure, as well as means for anchoring the anchoring member in a relatively yieldable support structure. The first-mentioned means is formed as a first section of the inner bore which has an inner diameter at most equal to the root diameter of the thread of the threaded member so that when the latter is inserted in the first section of the inner bore a respective portion of the anchoring member is clamped between turns of the thread of the threaded member and a wall of the mounting wall in the support structure. The second-mentioned means is formed as at least two slots located in a second portion of the anchoring member bounding a second section of the inner bore and imparting yieldability to the second portion so that when the threaded member is inserted into the second section of the inner bore the second portion of the anchoring member is substantially laterally outwardly displaced as a whole and is thereby clamped against the wall of the mounting hole in the support structure.

When the mounting element is constructed in accordance with the present invention, it can be used for mounting objects to a support structure both in the case when the support structure is a relatively unyieldable, and when the support structure is a relatively yieldable. In the first case sealing and wedging of the material of the anchoring member between the turns of the thread of the threaded member and the wall of the mounting hole assure an extremely high yielding force when the mounting element is anchored in a hard structure. When the mounting element is inserted into the mounting hole in a soft or relatively yieldable structure, the portion of the anchoring member having yieldability due to the provision of the slots is expanded and clamped against the wall of the mounting hole, whereby again a great holding force is attained. Since the material of the structure is yieldable, the material of the anchoring member is not cut by the threaded member, but, instead, the anchoring member is radially bulged in the direction towards the wall of the mounting hole.

Another feature of the present invention is that the threaded member has an outer diameter which is substantially equal to the outer diameter of the anchoring member. This makes possible to produce the mounting holes both in the support structure and in the object to be mounted with the same diameter and with the aid of a single working step. Then the anchoring member with the threaded member somewhat inserted into the inner bore of the former, is inserted into the mounting hole of the structure so deep as to provide mounting or to avoid crumbling in the region of an inlet of the mounting hole. In this case the threaded member rests directly on the wall of the mounting hole of the object to be mounted, and then during further threading of the threaded member it rests on the wall of the mounting hole in the support structure, whereby bending is excluded.

Still another feature of the present invention is that a projection is provided on the outer surface of the anchoring member, located adjacent to the slots and extending in the direction of elongation of the latter. Preferably the projection has a triangular configuration. When the mounting element is inserted in a very soft support structure threading resistance of the mounting element can exceed clamping resistance of the latter in the mounting hole so that during insertion of the mounting element clamping of the latter in the mounting hole is not possible. The projection provided on the outer surface of the anchoring member blocks and thereby clamps the mounting element in the mounting hole whereby relative rotation of the mounting element is prevented. The projection is located in the region of the slots, therefore, when the mounting element is inserted into a hard structure the projection can be displaced toward the slots so as to fill the latter. Bending of the projection into the slots, on the one hand, and the blocking in a soft support structure, on the other hand, are improved by the triangular configuration of the projection.

A further feature of the present invention is that the anchoring member has a wall portion separating each of the slots from the inner bore of the anchoring member. The wall portion may be formed as a thin film which is of one piece with a remainder portion of the anchoring member. The above wall portions reinforces the cross-section of the anchoring member, and at the same time does not undesirably affect the expansion of the anchoring member inasmuch as the wall portion is torn off under the action of a respective expansion force.

A still further feature of the present invention is that the first section of the inner bore of the anchoring member is conical, and a leading portion of the threaded member is tapered and has a cross-section corresponding to the cross section of the conical first section of the inner bore of the anchoring member. The conical section of the inner bore of the anchoring member is provided with inner ribs. The above features give a possibility to thread the threaded member into the anchoring member, for instance for forming a compact unit ready-to-sell without previous expansion of the anchoring member preventing insertion of the mounting element in the mounting hole. The fact that the slots of the anchoring member are closed at their both axial ends also helps to provide the above results, inasmuch as in the region of the conical sections of the inner bore the anchoring member has a circumferentially complete outer surface.

An additional feature of the present invention is that a tip portion is provided at an insertion end of the mounting element. The tip portion which can be extruded together with the remainder portion of the anchoring member or attached to the latter, facilitates insertion of the mounting element especially into narrow mounting holes so that blocking or bending of the mounting element cannot occur. Since the tip portion closes the insertion end of the mounting element, drillings cannot penetrate into the latter.

A still additional feature of the present invention is that the tip portion of the anchoring member is detachably connected with the remainder portion thereof, for instance by a constriction separating the tip portion from the remainder portion. In this case the threaded member, inspite of the provision of tip portion can be fully threaded in. When a circumferential groove is provided near the tip portion the latter can be torn off from the remainder portion, and when a longitudinal constriction open at the tip is provided the tip portion can be split.

A still further feature of the present invention is that the threaded member has a threadless section and a threaded section, and that a length of the threadless section of the threaded member substantially corresponds to the length of the portion of the threaded section which is sufficient for anchoring the mounting element. In this case the same mounting element can be used for mounting several objects whose clamping length is not greater than the length of threading in of the threaded member into the anchoring member. It is only necessary that the mounting element with the threaded member only slightly threaded thereinto be so located in the mounting hole that an initial portion of the threadless section of the threaded member lies in a plane corresponding to an outer plane of the object to be mounted. Since the length of the threadless section of the threaded element corresponds to the length of the threading in, it is guaranteed that, one the one hand, the threaded member is fully inserted into the anchoring member, and, on the other hand, clamping of the objects to be mounted is obtained. The smaller is the thickness of the objects to be mounted, the deeper is the mounting member inserted in the mounting hole. In order to guarantee that the mounting element in any case is anchored in the support structure, the objects to be mounted must not be thicker than the length of threading in.

In addition to the possibility to mount the objects with various thicknesses with the aid of the same mounting element, the construction in accordance with the invention also facilitates secure mounting of the objects inasmuch as for anchoring the mounting element independently of the thickness of the objects must always be used the full threading length.

The novel features which are considered as charactistic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a view showing a mounting element in accordance with the present invention, inserted into a mounting hole of a support structure.

DESCRIPTION OF THE PREFERRED EMBODIMENTS

Figure 1:
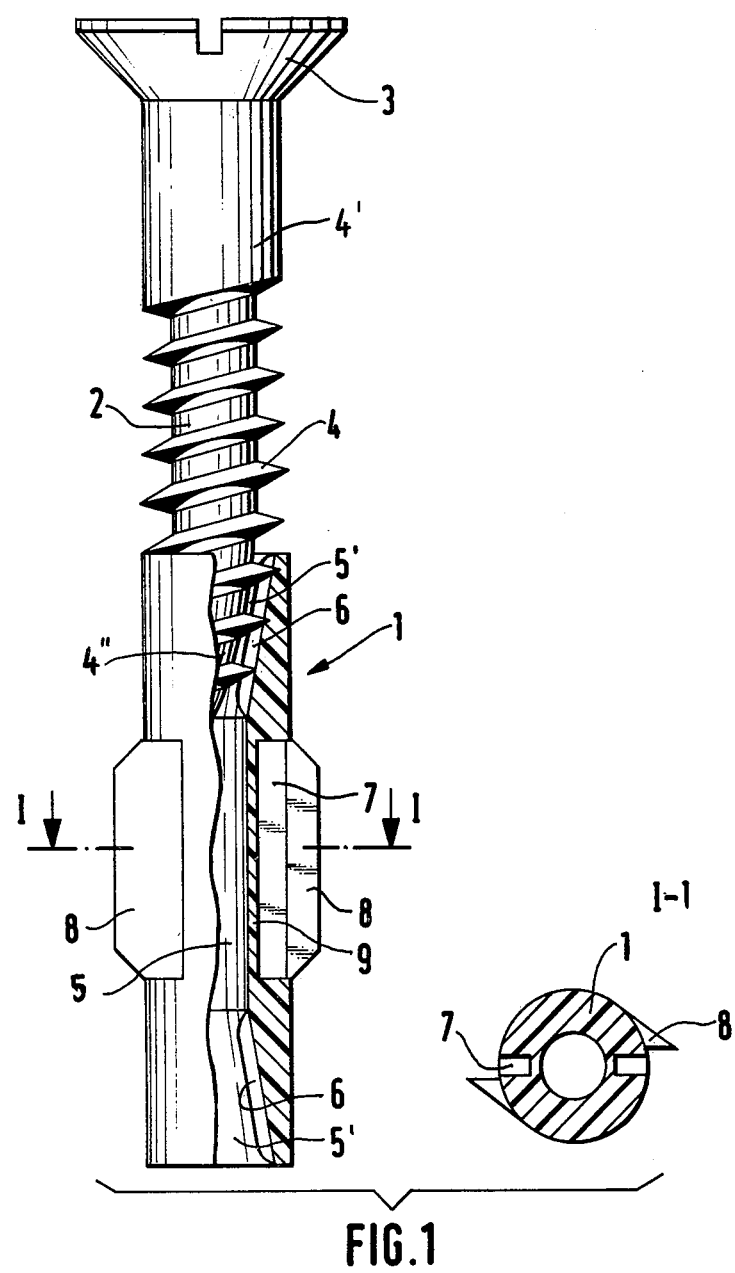
FIG. 1 is a view showing a mounting element in accordance with the present invention, including an outer sleeve-shaped anchoring member and an inner threaded member inserted in an inner bore of the anchoring member.
Figure 2:
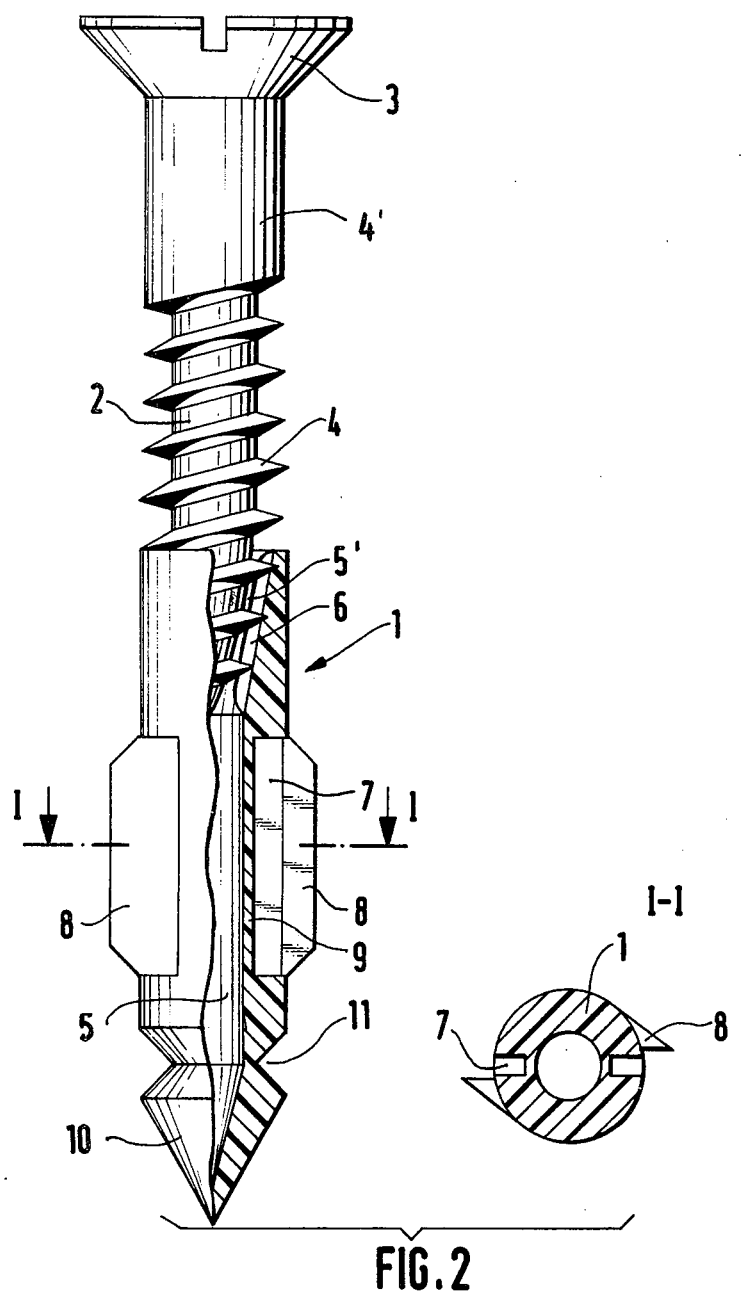
FIG. 2 is a view showing a mounting element in accordance with the present invention, provided with a tip portion.

A mounting element for mounting an object to a support structure has an outer sleeve-shaped anchoring member identified in toto by reference numeral 1, and an inner threaded member identified by reference numeral 2. In order to mount the object to the structure mounting holes must be provided both in the structure and in the object, having diameters corresponding to an outer diameter of the threaded member 2. The threaded member 2 has a head, a threadless portion 4' and a threaded portion 4. The anchoring member 1 has an inner bore 5 having two conical end sections 5'. Inner ribs 6 are formed on an inner surface of the conical sections 5' of the inner bore 5. A threaded tip portion 4" of the threaded member 2 can be inserted into the conical sections 5' of the inner bore 5 provided with the ribs 6 so as to form a compact mounting unit. An inner diameter of the sections 5' of the inner bore 5 is substantially equal to the root diameter of the thread of the threaded portion of the threaded member 2. Thus, the threaded member 2 can be threaded into the sections 5' having circumferentially complete walls without expansion of the anchoring member.

When the anchoring member 1 together with the threaded member 2 is inserted in the mounting hole, the threaded member 2 is further threaded into the anchoring member 1 so as to mount the objects. In a hard support structure the thread of the threaded member during threading in penetrates into the material of the anchoring member with simultaneous sealing and wedging this material between the turns of the threads and the wall of the mounting hole.

The anchoring member has two slots 7 located in the region between the two sections 5' of the inner bore 5. The slots 7 are closed at their both axial ends and impart yieldability to a respective portion of the anchoring member 1. When the mounting element in accordance with the invention mounts the objects to a soft support structure and the threaded member 2 is inserted into the anchoring member 1 the yieldable portion of the anchoring member 1 is expanded and firmly clamped against the wall of the mounting hole.

Projections 8 are provided in the anchoring member 1, located adjacent to the slots 7 and extending in the direction of elongation of the latter. When the mounting element mounts the objects to a soft support structure the projections 8 serve for preventing relative rotation of the mounting element, and when the mounting element is used in a hard support structure the projections 8 fill the slots 7. The projections 8 have a triangular configuration so as to reinforce the same in the direction of rotation, and also for improved bending of the projections into the slots during anchoring the mounting element in a hard support structure.

A wall portion 9 separates the slots 7 from the inner bore 5 of the anchoring member. This wall portion reinforces the cross section of the anchoring member. The wall portion 9 may be formed as a thin film which is of one-piece with the remainder portion of the anchoring member.

A tip portion 10 may be provided at an insertion end of the anchoring member 1. It is especially advisable to provide such tip portion in the cases when the mounting hole has a smaller diameter than the diameter of the mounting element. The tip portion 10 of the anchoring member 1 prevents blocking of the mounting element in the mounting hole and penetration of drillings into the inner bore 5 of the anchoring member 1.

In order to assure the full insertion of the threaded member, the tip portion 10 may be made breakable by means of a groove-like constriction 11 separating the tip portion 10 from the remainder portion of the anchoring member 1. On the other hand, the tip portion 10 may be provided with a constriction open at a tip so that during threading of the threaded member the tip portion can be split. In order to mount the object 13 to the support structure 12, the mounting element passes through the mounting hole 15 of the object 13 and is inserted into the mounting hole 14 of the support structure 12. The diameter of the mounting hole 14 corresponds to the outer diameter of the threaded member 2 of the mounting element. The threaded portion 4 of the threaded member 2 has a length corresponding to the length of the anchoring member 1. The threadless portion 4' of the threaded member 2 has a length corresponding to the length of the portion of the threaded member which is sufficient to anchor the anchoring member 1 in the mounting hole, that is to the length of the anchoring member 1.

In order to anchor the mounting element, the anchoring member 1 with the threaded member 2 is inserted into the mounting hole 14 until an initial section of the threadless portion 4' of the threaded element 2 is located in a plane corresponding to the outer face of the object 13 to be mounted to the support structure 12. After this the threaded member 2 is threaded into the anchoring member 2 in order to mount the objects. Due to the above relation between the length of the threadless portion of the threaded element and the length of the threading in, it is guaranteed that in any case clamping of the objects to be mounted will be attained.

It will be understood that each of the elements described above, or two or more together, may also find a useful application in other types of constructions differing from the types described above.

While the invention has been illustrated and described as embodied in a mounting element for mounting an object to a support structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A mounting element for mounting an object to a support structure, comprising an outer sleeve-shaped anchoring member adapted to be inserted into a mounting hole of a support structure, said anchoring member having an inner bore, an axis and two axial ends; an inner threaded member insertable into said inner bore of said anchoring member; means for anchoring said anchoring member in a relatively unyieldable support structure, including a first portion of said anchoring member bounding a first section of said inner bore which has an inner diameter at most equal to the root diameter of the thread of said threaded member so that when the latter is inserted in said first section of said inner bore a respective position of said anchoring member is clamped between turns of the thread of said threaded member and a wall of the mounting hole in the support structure; and means for anchoring said anchoring member in a relatively yieldable support structure, including at least two slots formed in a second portion of said anchoring member bounding a second section of said inner bore, and imparting yieldability to said second portion so that when said threaded member is inserted in said second section of said inner bore said second portion of said anchoring member is substantially laterally outwardly displaced as a whole and is thereby clamped against the wall of the mounting hole in the support structure, said first section of said inner bore of said anchoring member being located adjacent to one of said axial ends and having a cross-section which increases towards said one axial end, said inner bore having another such first section formed adjacent to the other axial end and having a cross-section increasing toward said other axial end.

2. The mounting element as defined in claim 1, wherein said first sections of said inner bore of said anchoring member are conical.

3. The mounting element as defined in claim 1, wherein said anchoring member has a predetermined outer diameter, said threaded member having an outer diameter substantially equal to the outer diameter of said anchoring member.

4. The mounting element as defined in claim 1, wherein said slots extend in an axial direction of said anchoring member.

5. The mounting element as defined in claim 4, wherein each of said slots has two further axial ends and is closed at each of said ends.

6. The mounting element as defined in claim 1; and further comprising means for preventing rotation of said anchoring member and including a projection formed in and outwardly projecting from said second portion of said anchoring member.

7. The mounting element as defined in claim 6, wherein said slots extend in a first direction of said anchoring member, said projection being located adjacent to said slots and extending in said first direction.

8. The mounting element as defined in claim 6, wherein said projection has a triangular configuration.

9. The mounting element as defined in claim 1; and further comprising a wall portion separating each of said slots from said inner bore of said anchoring member.

10. The mounting element as defined in claim 9, wherein said wall portion is a thin film.

11. The mounting element as defined in claim 9, wherein said wall portion is of one piece with a remainder portion of said anchoring member.

12. The mounting element as defined in claim 1, wherein said threaded member has a threaded leading portion and a trailing portion as considered in the direction of insertion of said threaded element into said anchoring member, said leading portion of said threaded member being tapered and having a cross section corresponding to the cross section of said first sections of said inner bore of said anchoring member.

13. The mounting element as defined in claim 12, wherein said first sections of said inner bore of said anchoring member have ribs provided on an inner surface of a wall bounding said first sections.

14. The mounting element as defined in claim 1, wherein said threaded member has a leading end and a trailing end as considered in the direction of insertion of said threaded member into said anchoring member, said threaded member having a threaded leading section adjacent to said leading end and a threadless trailing section adjacent to said trailing end of said threaded member, said threaded leading section of said threaded member having a portion threadable into said anchoring member for a predetermined distance sufficient to anchor the latter in the support structure, said threadless section of said threaded member having a length which is equal to a length of said portion.

15. The mounting element as defined in claim 1, wherein said sections of said inner bore of said anchoring member being separate sections which are formed at separate axially spaced locations of said inner bore in consecutive order one after the other so as not to overlap each other.

* * * * *